United States Patent
Kitaguchi et al.

Patent Number: 5,226,977
Date of Patent: Jul. 13, 1993

[54] METHOD OF HARDFACING AN ENGINE VALVE OF A TITANIUM MATERIAL

[75] Inventors: Saburo Kitaguchi; Tohru Saito; Yasuo Tsukahara; Yasutoshi Nakada, all of Kanagawaken, Japan

[73] Assignee: Nippon Steel Corporation, Tokyo, Japan

[21] Appl. No.: 507,854

[22] Filed: Apr. 12, 1990

[30] Foreign Application Priority Data

Apr. 12, 1989 [JP] Japan .................. 1-92629

[51] Int. Cl.⁵ ............................. B23K 9/00
[52] U.S. Cl. ................... 148/281; 123/90.51; 428/553; 428/660; 428/667
[58] Field of Search ............ 428/660, 667, 553; 148/281, 903; 123/90.51; 420/436

[56] References Cited

U.S. PATENT DOCUMENTS

| | | | |
|---|---|---|---|
| 4,485,770 | 12/1984 | Saka et al. | 123/90.51 |
| 4,583,502 | 4/1986 | Takahashi et al. | 123/90.51 |
| 4,878,953 | 11/1989 | Saltzman et al. | 148/903 |
| 4,902,359 | 2/1990 | Takeuchi et al. | 148/421 |
| 4,946,749 | 8/1990 | Restall et al. | 428/660 |
| 5,035,958 | 7/1991 | Jackson et al. | 428/553 |
| 5,077,140 | 12/1991 | Luthra et al. | 428/660 |
| 5,084,113 | 1/1992 | Mori et al. | 148/903 |

FOREIGN PATENT DOCUMENTS

3219071 11/1983 Fed. Rep. of Germany.

*Primary Examiner*—Upendra Roy
*Attorney, Agent, or Firm*—Wenderoth, Lind & Ponack

[57] ABSTRACT

A method is provided for forming a thick and hard deposit having excellent thermal shock resistance on an engine valve made of a titanium material, particularly on its face and stem end, without allowing the formation of any brittle compound layer between the deposit and the valve material. An engine valve hardfaced on its face and stem end is also provided. A powder comprising a titanium material and 1 to 90% by weight of cobalt, or at least 25% by weight of a titanium material, 1 to 50% by weight of cobalt and 1 to 50% weight of a cobalt-based alloy is fused and deposited on an engine valve mad of a titanium material (e.g., on its face), and the deposited material is aged. The powder is prepared by mixing at least two powders, or from a molten alloy containing all of its constituents, to form a thick and hard deposit having excellent thermal shock and wear resistance on, e.g., the face of the engine valve and is, therefore, of high industrial utility.

5 Claims, 5 Drawing Sheets (a) After Aging for 2hrs at 450°C (b) As Hardfaced

METHOD OF HARDFACING AN ENGINE VALVE OF A TITANIUM MATERIAL

FIELD OF THE INVENTION AND RELATED ART STATEMENT

This invention relates to a method of hardfacing an engine valve made of titanium or a titanium alloy (hereinafter referred to as a titanium material), particularly its face and stem end. It also relates to an engine valve made of a titanium material and having a face and a stem end which have been hardfaced.

It has been considered necessary to form a hardfacing pad on the face of each of the intake and exhaust valves of an engine for an automobile, etc. in order to improve its wear resistance at a high temperature. In this connection, it has been usual practice to manufacture an engine valve from a heat resisting steel, for example, martensitic stainless steel SUH 3 according to the specification of JIS 4311, and form a hardfacing pad of a cobalt-based Stellite alloy on its face.

The Satellite alloys are often used because of their high hardness and excellent thermal shock resistance.

The use of titanium alloys has come to be studied for making an engine valve having a smaller weight.

Japanese Patent Application laid open under No. 23574/1986 proposes the formation of a hardfacing pad composed of titanium and a metal carbide on the face of an engine valve made of a titanium alloy.

According to its disclosure, however, a mixture of powders of titanium and metal carbide having high hardness is used to form a hardened pad comprising a titanium layer in which the carbide particles are dispersed, and the powder mixture is not melted to form a hardened pad.

Japanese Patent Application laid open under No. 270277/1987 describes various hardening elements and gases. They are, however, different in composition from the hardfacing material which is employed by this invention to form a pad on the surface of a titanium material.

Moreover, the use of a Stellite alloy to form a welded hardfacing pad on a titanium material has been found undesirable because of the remarkable growth of a compound which forms a brittle joint.

OBJECTS AND SUMMARY OF THE INVENTION

It is, therefore, an object of this invention to provide a method which can form a thick and hard pad or bead of fused material having excellent thermal shock resistance on an engine valve made of a titanium material, particularly on its face and stem end, without allowing the formation of any brittle compound layer at the junction between the titanium material and the pad.

It is another object of this invention to provide an engine valve made of a titanium material and having a hardened pad formed on each of its face and stem end.

As a result of our extensive range of experiments, we, the inventors of this invention, have found that a pad which is comparable in adhesion, hardness and thickness to a known pad formed from a Stellite alloy on an engine valve made of heat-resisting steel, can be formed on a base made of a titanium material if a fused powder of a mixture of a titanium material and cobalt, a mixture of a titanium material, cobalt and a cobalt-based alloy, or a mixture of a titanium material and a cobalt-based alloy is deposited on the base by plasma coating, and if the deposited material is aged.

According to an aspect of this invention, there is provided a method of hardfacing an engine valve made of a titanium material which comprises depositing a fused powder comprising a titanium material and 1 to 90% by weight of cobalt on each of the face and stem end of the valve to form a pad thereon, and aging the pad.

According to another aspect of this invention, there is provided a method of hardfacing an engine valve made of a titanium material which comprises depositing a fused powder comprising at least 25% by weight of a titanium material, 1 to 50% by weight of cobalt and 1 to 50% by weight of a cobalt-based alloy on the valve to form a pad thereon, and aging the pad.

According to a still another aspect of this invention, there is provided a method of hardfacing an engine valve made of a titanium material which comprises depositing a fused powder comprising a titanium material and 1 to 50% by weight of a cobalt-based alloy on the valve to form a pad thereon, and aging the pad.

In whichever event, the powder may be one prepared by mixing at least two powders, or one formed from an alloy which has been prepared from a mixture of at least two powders.

According to a further aspect of this invention, there is provided an engine valve made of a titanium material and having a hardened pad formed on each of its face and stem end.

Other features and advantages of this invention will become apparent from the following description and the accompanying drawings.

DETAILED DESCRIPTION OF THE INVENTION

The engine valve of this invention, or the engine valve which is hardfaced by the method of this invention, is made of a titanium material. A titanium alloy is, however, generally preferred. Examples of the titanium alloys which are suitable as engine valve material are Ti-6Al-4V, which is the most typical of all, Ti-6Al-2Sn-4Zr-2Mo, and Ti-5Al-2.5Sn.

A cobalt-based alloy is one of the constituents of the powder which is used to form a hardfacing. A Stellite (tradename) alloy is a typical cobalt-based alloy. Typical Stellite alloys are Stellite No. 1 (having the composition represented as 30Cr-2.5C-1Si-1Mn-1Mo-3Fe-3Ni-12.5W, the balance being Co), Stellite No. 6 (28Cr-1.1C-1Si-1Mn-1Mo-3Fe-3Ni-4W, the balance being Co), Stellite No. 12 (29Cr-1.4C-1.4Si-1Mn-1Mo-3Fe-3Ni-8W, the balance being Co), and Stellite No. 21 (27Cr-0.25C-2Si-1Mn-5.5Mo-2Fe-2.8Ni, the balance being Co).

Other cobalt-based alloys that can be employed are those which can generally be expressed as MCrAlX, including an alloy of cobalt, chromium, aluminum and yttrium (e.g., 29Cr-6Al-1Y, the balance being Co), and an alloy of cobalt, nickel, chromium, aluminum and yttrium (e.g., 32Ni-21cr-8Al-0.5Y, the balance being Co).

We have considered that the deterioration of the joint between a titanium material and a Stellite alloy forming a hardfacing thereon is due to the formation of a compound phase therebetween, and tried to find out a material which can overcome any such problem. As a result, we have found that the problem can be overcome by a powder comprising a mixture of a titanium material with cobalt or a cobalt-based alloy, or both, and that the thickness of a deposit can be controlled if the proportion of the titanium material in the powder is altered. We have also found that cobalt is effective for improving the wetting property of a deposit at its edges. We have further found that the powder can form a deposit which is comparable in hardness and thickness to any known deposit formed by a Stellite alloy, since the titanium material permits the addition of a Stellite alloy as a typical cobalt-based alloy and the mixture exhibits hardness when aged.

The hardfacing powder material which is used for the purpose of this invention consists of plural constituents. Especially a titanium alloy powder may be prepared by mixing a pure titanium powder and a 60 Al-40V alloy powder, though a titanium alloy powder can also be prepared from a molten titanium alloy. The former type of powder is finer and is, therefore, more suitable for making a hardfacing or padding material which exhibits a higher degree of efficiency when it is melted to form a deposit.

The hardfacing powder can be prepared if appropriate proportions of powders of a titanium material, and cobalt and/or a cobalt-based alloy are mixed by, for example, a V-type mixer. If this mixture is used for a prolonged padding job, however, it is likely to have different proportions of its constituents with the passage of time, depending on various factors, such as its particle size and shape, particle size distribution, and specific density.

Therefore, the alloying of the constituents is very effective for preparing a powder which can retain the appropriate proportions of its constituents for a long period of time.

This type of powder can, for example, be prepared by melting the constituent materials in a very clean atmosphere, solidifying the molten material, and melting the solidified material using a plasma arc or other source of heat, while rotating it at a high speed, so that the molten material may be centrifugally scattered to form a powder. Another method comprises forming the constituent materials into a solid mass by a cold process employing hydrostatic pressure, sintering it, and melting the sintered product, while scattering the molten material.

The constituents of the hardfacing powder according to this invention exhibit remarkably good properties as desired of a hardfacing material. The experiments which we have conducted to form deposits by using powders comprising different proportions of a titanium material and cobalt, have revealed a close correlation between the thickness and hardness of the deposits and the wetting (spreading) property thereof at the bead edges. More particularly, we have found that an increase in the proportion of the titanium material leads to an increase in the thickness of the deposit, while an increase in the proportion of cobalt brings about an increase in hardness and an improved wetting (spreading) property of the bead edges.

We have plotted these results to present as FIG. 1 a graph showing the hardness and thickness of the deposits in relation to the proportions of the constituents of the powder.

A powder comprising a titanium material and 1 to 90% by weight of cobalt can form a deposit having appropriate levels of hardness and thickness. Any powder containing only less than 1% by weight of cobalt fails to form a deposit which can be satisfactorily hardened when it is aged. The presence of more than 90% by weight of cobalt results in a deposit having an undesirably small thickness.

The experiments which we made by using powders comprising a titanium material, cobalt and a cobalt-based alloy have taught us that an increase in the proportion of the cobalt-based alloy results in a deposit having a higher degree of hardness.

If the powder contains only less than 25% by weight of a titanium material, it fails to form a deposit having an appropriately large thickness. If the powder contains only less than 1% by weight of a cobalt-based alloy, the deposit fails to be satisfactorily hardened when it is aged, while the use of any powder containing more than 50% by weight of a cobalt-based alloy results in a deposit which is likely to crack. The maximum proportion of cobalt is limited to 50% by weight in view of the proportion of the cobalt-based alloy which the powder also contains.

We have plotted some of the results of our experiments to present as FIG. 2 a graph showing the hardness of the deposits in relation to the proportions of the constituents of the powder.

The experiments which we made by using powders comprising a titanium material and a cobalt-based alloy have also taught us that an increase in the proportion of a cobalt-based alloy results in a deposit having a higher degree of hardness.

If the powder contains more than 50% by weight of a cobalt-based alloy, however, the deposit is likely to crack, while the use of any powder containing less than 1% by weight of such alloy results in a deposit which fails to be satisfactorily hardened when it is aged. Therefore, the hardfacing material according to still another aspect of this invention is a powder comprising a titanium material and 1 to 50% by weight of a cobalt-based alloy.

We have plotted the results to present as FIG. 3 a graph showing the hardness of the deposits in relation to the proportions of the constituents of the powder.

We have also conducted experiments by using as the titanium material the powder prepared by mixing a pure titanium powder and a 60Al-40V alloy powder, and obtained similar results to those which we have hereinabove stated, though we do not present any graph showing the results.

Reference is now made to FIG. 4 showing the hardness of the deposits as aged in relation to the aging temperature, based on the results of our experiments.

As is obvious from FIG. 4, all of the powders having different compositions, but falling within the scope of this invention formed deposits showing a marked improvement in hardness when aged. They exhibited a particularly large increase in hardness when they had been aged at a temperature of 450° C. for two hours.

According to the method of this invention, a mixed powder as stated above is deposited on the face or stem end of an engine valve and the deposited material is aged. The deposition of the material may be effected by plasma-arc welding, but other methods, such as TIG, laser or electron beam welding, can also be employed. The effect of aging can be attained by a different process of heat treatment, too, for example, nitriding in a cyanogen bath at 550° C., or the physical vapor deposition of TiN.

BRIEF DESCRIPTION OF THE DRAWINGS

In FIG. 5(a), the valve 1 has a face 2 including a rim portion 3 adapted to contact a valve rest formed at the intake or exhaust port of the engine. As it is liable to wear, a hardened deposit, or hardfacing 4 is formed on the rim portion 3 to protect it and render it resistant to wear, as shown in FIG. 5(b). The valve 1 also has a hardfacing 5 formed on its stem end to render it resistant to wear.

DETAILED DESCRIPTION OF THE PREFERRED EMBODIMENTS

Figure 1:
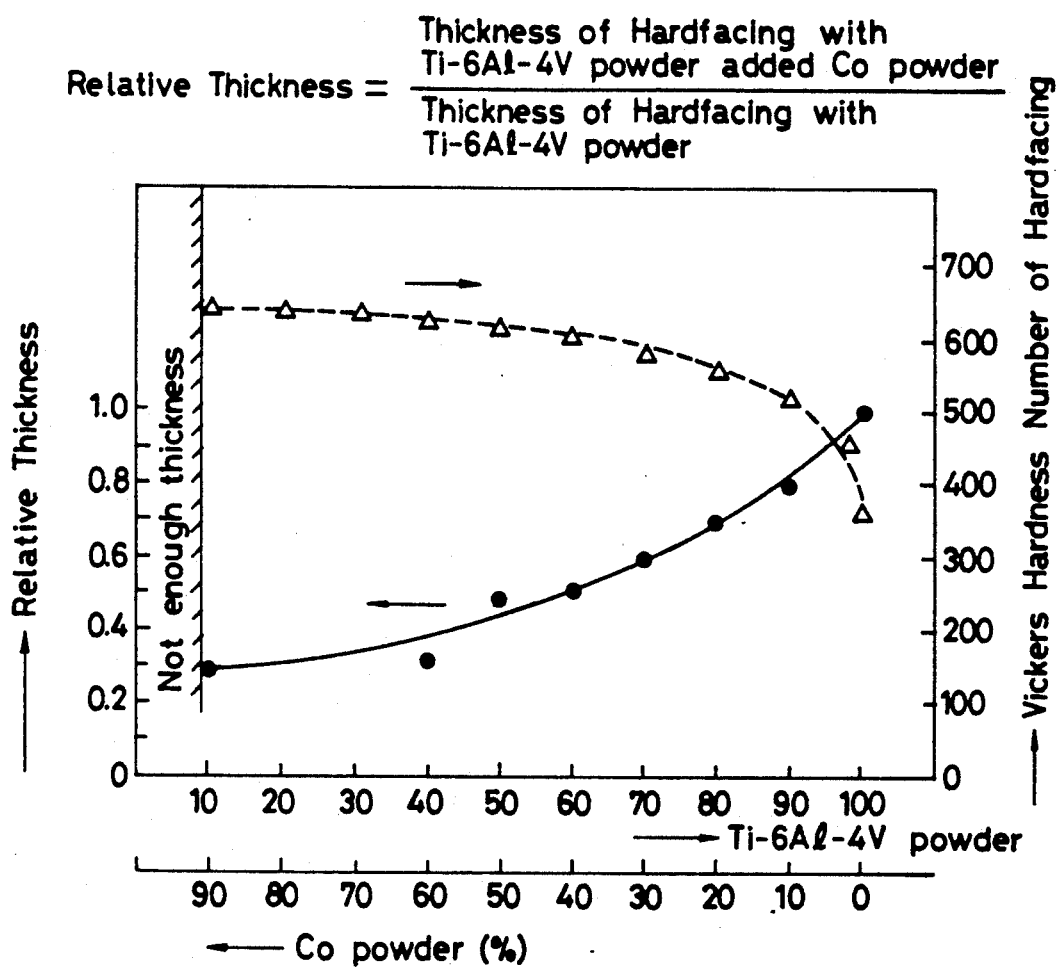
FIG. 1 is a graph showing the thickness and hardness of a hardfacing or pad in relation to proportions of a titanium material and cobalt in their mixture used to form the hardfacing.
Figure 2:
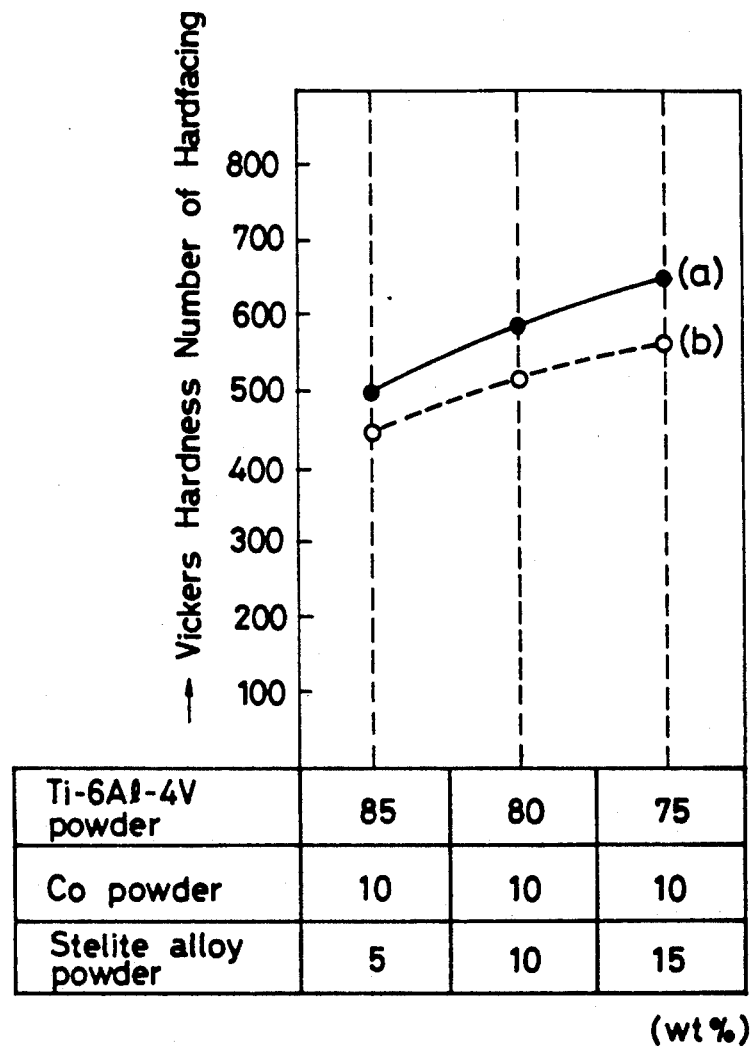
FIG. 2 is a graph showing the hardness of a hardfacing in relation to the proportions of a titanium material, cobalt and a Stellite alloy.
Figure 3:
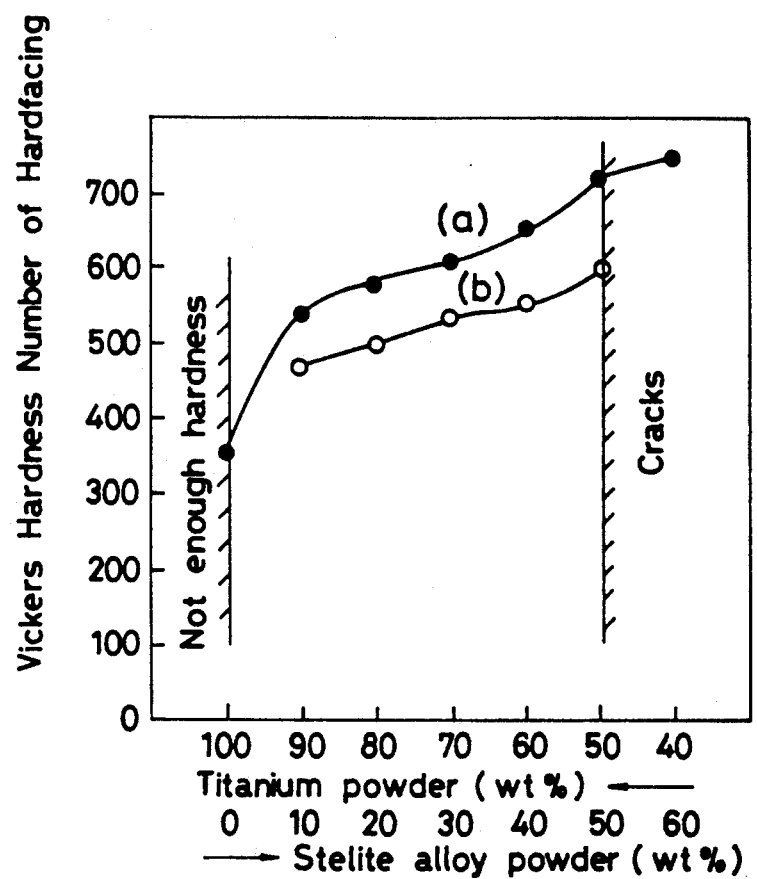
FIG. 3 is a graph showing the hardness of a hardfacing in relation to the proportions of a titanium material and a Stellite alloy.
Figure 4:
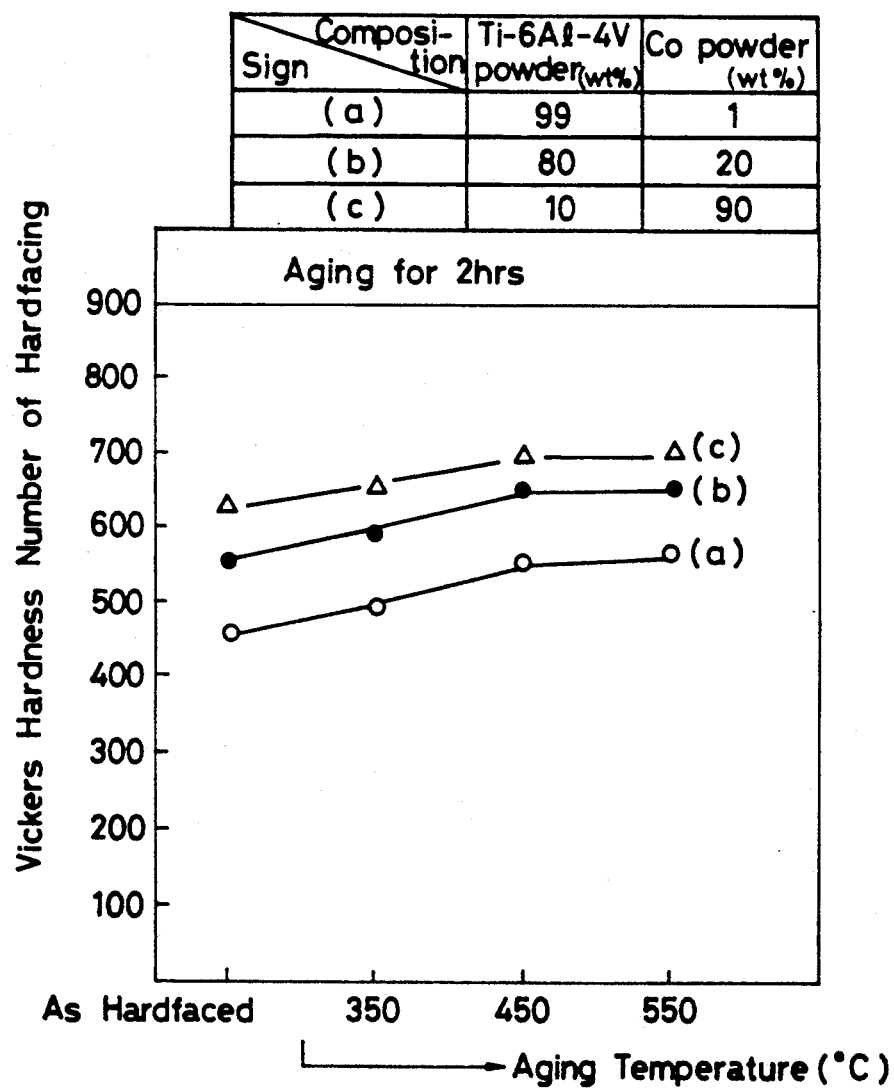
FIG. 4 is a graph showing the hardness of a hardfacing in relation to the aging temperature.
Figure 5A:
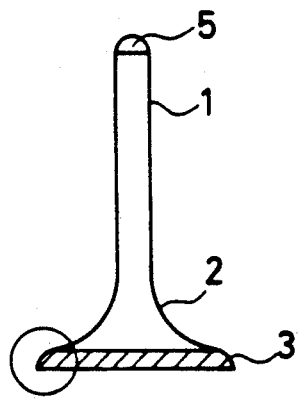
FIG. 5(a) is a schematic elevational view of a hardfaced engine valve embodying this invention.
Figure 5B:
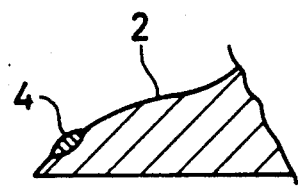
FIG. 5(b) is an enlarged cutaway view of the valve face portion which is encircled in FIG. 5(a).

The invention will now be described more specifically with reference to several examples which are believed to confirm the unexpected results of this invention.

EXAMPLE 1

A powder comprising a titanium alloy and cobalt was fused by plasma-arc and deposited on the rim portion of the face of an engine valve made of a titanium alloy, and the deposited material was aged to form a hardfacing. The following is a listing of the materials and conditions which were employed, and the results which were obtained:

(1) Valve material: Ti-6Al-4V alloy;
(2) Powder: A mixture of 90% by weight of Ti-6Al-4V alloy powder and 10% by weight of cobalt powder;
(3) Welding conditions:
Welding current—50 A;
Welding rate—500 mm/min.;
Shield gas—Pure argon supplied at a rate of 30 liters per minute;
(4) Thickness of deposit: 0.8 mm;
(5) Aging conditions: Temperature—450° C.; and Holding time—2 h.;
(6) Hardness of deposit as aged: $H_v$ 600 on the average.

EXAMPLE 2

A powder comprising a titanium alloy, cobalt and Stellite No. 21 was likewise fused by plasma-arc and deposited on an engine valve made of a titanium alloy, and the deposited material was aged to form a hardfacing. The following is a listing of the materials and conditions which were employed, and the results obtained:

(1) Valve material: Ti-6Al-4V alloy;
(2) Powder: A mixture of 80% by weight of Ti-6Al-4V alloy, 10% by weight of cobalt and 10% by weight of Stellite No. 21;
(3) Welding conditions:
Welding current-50 A;
Welding rate- 500 mm/min.;
Shield gas- Pure argon supplied at a rate of 30 liters per minute;
(4) Thickness of deposit: 0.8 mm;
(5) Aging conditions: Temperature—450° C.; and Holding time—2 h.;
(6) Hardness of deposit as aged: $H_v$ 600 on the average.

EXAMPLE 3

A powder comprising a titanium alloy and a cobalt-based alloy was fused by plasma-arc and deposited on an engine valve made of a titanium alloy, and the deposited material was aged to form a hardfacing. The following is a listing of the materials and conditions which were employed, and the results obtained:

(1) Valve material: Ti-6Al-4V alloy;
(2) Powder: A mixture of 80% by weight of Ti-6Al-4V alloy and 20% by weight of Stellite No. 21;
(3) Welding conditions:
Welding current—50 A;
Welding rate—500 mm/min.;
Shield gas—Pure argon supplied at a rate of 30 liters per minute;
(4) Thickness of deposit: 0.8 mm;
(5) Aging conditions: Temperature—450° C.; and Holding time—2 h.;
(6) Hardness of deposit as aged: $H_v$ 600 on the average.

EXAMPLE 4

A powder comprising a titanium alloy and a cobalt-based alloy was fused by plasma-arc and deposited on the stem end of an engine valve made of a titanium alloy, and the deposited material was aged. The following is a listing of the materials and conditions which were employed, and the results obtained:

(1) Valve material: Ti-6Al-4V alloy;
(2) Stem end diameter: 7 mm;
(3) Powder: A mixture of 80% by weight of Ti-6Al-4V alloy and 20% by weight of Stellite No. 21;
(4) Welding conditions:
Welding current—50 A;
Shield gas—Pure argon supplied at a rate of 30 liters per minute;
(5) Thickness of deposit: 2 mm;
(6) Aging conditions: Temperature—450° C.; Holding time—2 h.;
(7) Hardness of deposit as aged: $H_v$ 600 on the average.

The engine valves which had been hardfaced on the faces (EXAMPLES 1 to 3) or the stem end (EXAMPLE 4) were tested for thermal shock resistance. Each hardfaced part of each engine was heated to a temperature of 500° C. by a burner, and was immediately cooled in water. This cycle was repeated 100 times. No separation of the deposit from its base was observed in any of the valves.

The results of these examples confirm that a powder comprising a mixture of a titanium material with cobalt or a cobalt-based alloy, or both, can form a hardfacing deposit exhibiting excellent thermal shock and wear resistance on the face or stem end of an engine valve made of a titanium material without allowing the formation of any brittle compound, and that this invention, therefore, has a high level of industrial utility.

What is claimed is:

1. A method of hardfacing an engine valve made of a titanium material which comprises:

forming a deposit of a fused powder comprising a titanium material and 1 to 90% by weight of cobalt on said valve; and
age-hardening said deposit.

2. A method of hardfacing an engine valve made of a titanium material which comprises:
forming a deposit of a fused powder comprising at least 25% by weight of a titanium material, 1 to 50% by weight of cobalt and 1 to 50% by weight of a cobalt-based alloy on said valve; and
age-hardening said deposit.

3. A method of hardfacing an engine valve made of a titanium material which comprises:
forming a deposit of a fused powder comprising a titanium material and 1 to 50% by weight of a cobalt-based alloy on said valve; and
age-hardening said deposit.

4. The method as set forth in claim 1, 2 or 3, wherein said powder is prepared by mixing at least two powders.

5. The method as set forth in claim 1, 2 or 3, wherein said powder is prepared from a molten alloy.

* * * * *